United States Patent [19]

Lai

[11] Patent Number: 5,479,709
[45] Date of Patent: Jan. 2, 1996

[54] DUST REMOVING DEVICE FOR PORTABLE POWER SAW

[76] Inventor: Motor Lai, P.O. Box 82-144, Taipei, Taiwan

[21] Appl. No.: 329,096

[22] Filed: Oct. 25, 1994

[51] Int. Cl.⁶ .................................................. B23D 49/16
[52] U.S. Cl. .............................. 30/123.3; 30/392; 83/169
[58] Field of Search .................................... 30/123.3, 124, 30/392–394; 83/98, 169, 171; 408/61

[56] References Cited

U.S. PATENT DOCUMENTS

| | | | |
|---|---|---|---|
| 1,481,055 | 1/1924 | Fullbright | 30/342 X |
| 2,116,123 | 5/1938 | Ocenasek | 83/169 X |
| 4,870,755 | 10/1989 | Schiznler | 83/169 X |

*Primary Examiner*—Douglas D. Watts
*Attorney, Agent, or Firm*—Alfred Lei

[57] ABSTRACT

This invention relates to a bust removing device for a portable power saw and in particular to one mainly including a motor, a pinion mounted on the spindle of the motor, a gear meshed with the pinion and provided with an eccentric rod thereon, a yoke connected with the eccentric rod of the gear, a compressible air chamber connected at one end with the yoke, and a pipe having an end connected with an outlet of the air chamber and having the other end disposed behind the saw blade, whereby when the motor is turned on, the spindle thereof will drive the pinion which in turn will drive the gear thereby causing the eccentric rod to rotate about an axle of the gear and therefore, pulling the yoke to move backwards and forwards to compress the air chamber to exhaust air to remove the sew bust accumulated in front of the saw blade.

2 Claims, 3 Drawing Sheets

DUST REMOVING DEVICE FOR PORTABLE POWER SAW

CROSS-REFERENCE

This application is a substitute of the U.S. patent application Ser. No. 07/241,935, now abandoned.

BACKGROUND OF THE INVENTION

It is found that portable power tools such as portable saws powered by an electric motor are now widely utilized in various applications. It is highly desirable that such portable power tools be provided with means for continuously removing the small particles which are produced as a result of cutting. Further, it is preferred that such bust removing means should not unduly increase the external dimensions of the portable power tool.

The above requirements are not satisfied by prior art and it is an object of the present invention to provide a bust removing device for a power tool which may increase the working efficiency of the operator and prevent the operator from inhaling the saw bust.

SUMMARY OF THE INVENTION

This invention relates to a bust removing device for a portable power saw.

It is the primary object of the present invention to provide a dust removing device for a portable power saw which utilizes the spindle of the motor of the power saw to drive an eccentric rod via gears therefore, compressing an air chamber to exhaust air to blow away the saw dust accumulated in front of the saw blade.

It is another object of the present invention to provide a bust removing device for a power saw which may remove the saw bust automatically hence no longer requiring the operator to blow away the saw bust with his mouth and therefore, increasing the working efficiency.

It is still another object of the present invention to provide a dust removing device for a power saw by means which the operator has no need to blow away the saw dust with his mouth and so will not inhale the saw bust.

It is a further object of the present invention to provide a bust removing device for a power saw which is simple in construction and economic to produce.

The novel features which are characteristics of the invention, together with further objects and advantages thereof will be better understood from the following description considered in connection with the accompanied drawings and in which a preferred embodiment of the invention is illustrated by way of example. It is to be expressly understood, however, that the drawings are for the purpose of illustration and description only and are not intended as a definition of the limits of the invention.

DETAILED DESCRIPTION OF PREFERRED EMBODIMENT

Figure 1:
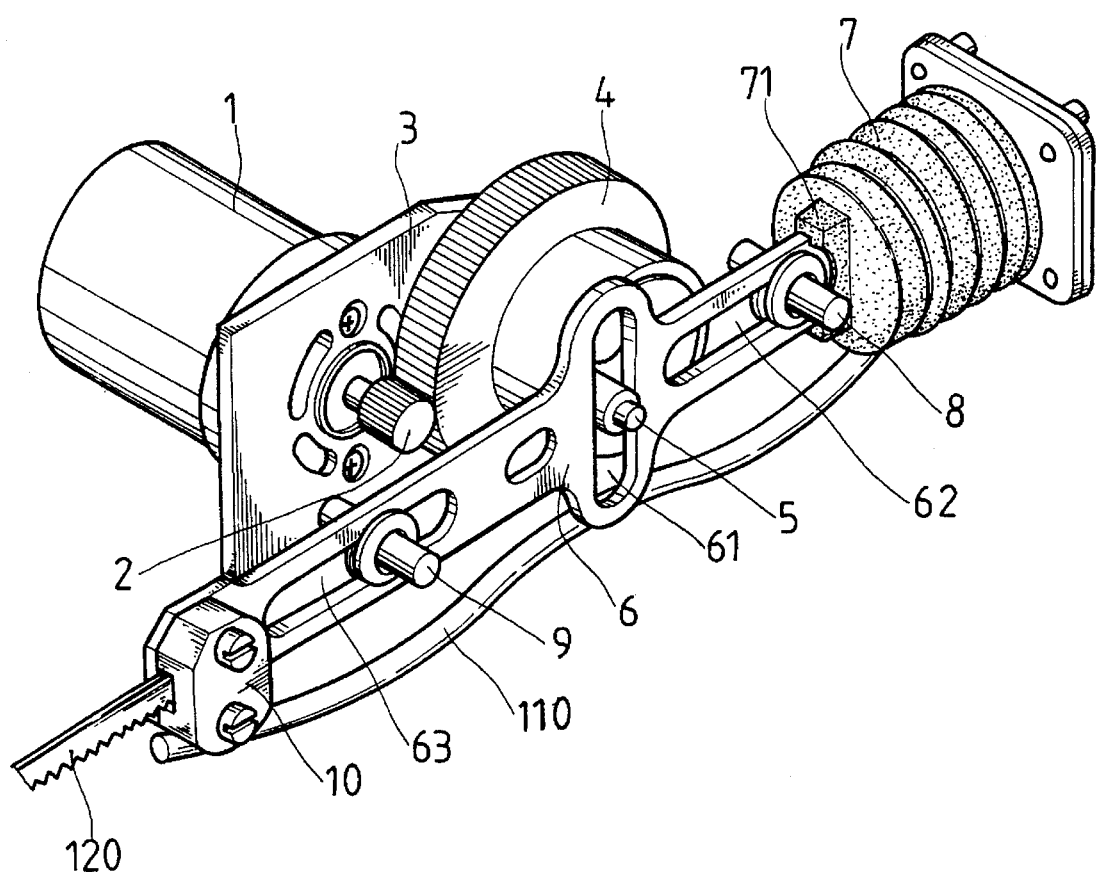
FIG. 1 is a perspective view of a dust removing device for a portable power saw according to preferred embodiment of the present invention.

For purposes of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further modifications in the illustrated device, and such further applications as would normally occur to one skilled in the are to which the invention relates.

Figure 2:
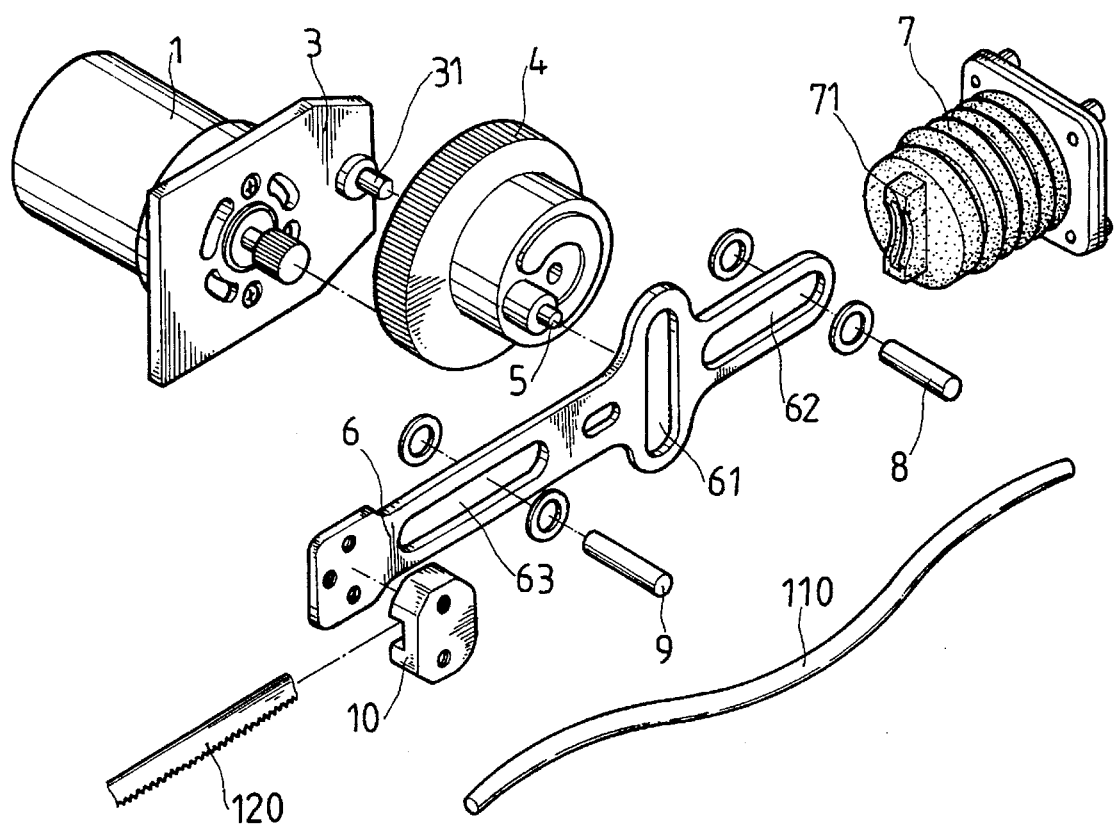
FIG. 2 is an exploded view of the dust removing device.
Figure 3:
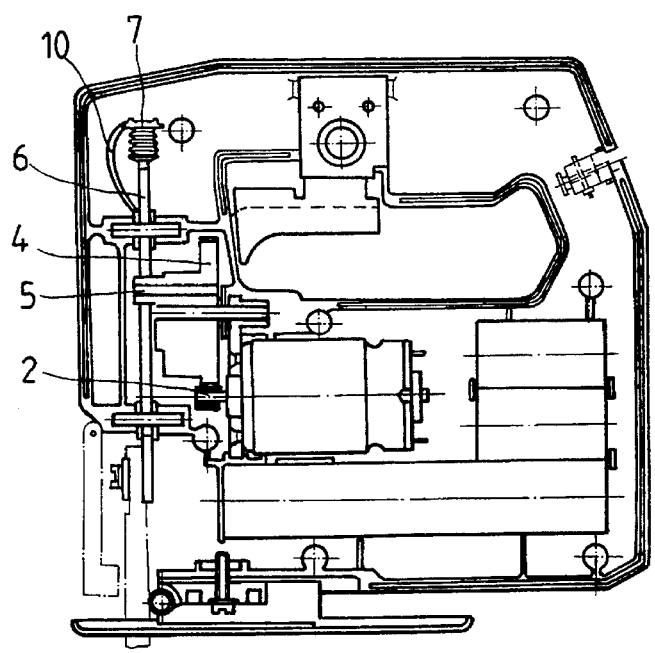
FIG. 3 is a working view of the dust removing removing device.
Figure 4:
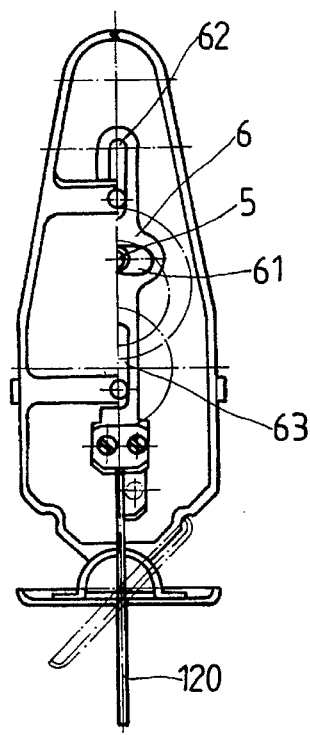
FIG. 4 is a side view of FIG. 3.

With reference to the drawings and in particular to FIGS. 1 and 2 thereof, the dust removing device for a power saw according to the present invention mainly comprises a driving device 1, a pinion 2, a gear 4, an eccentric rod 5, a yoke 6, an air chamber 7 and a plastic pipe 110.

The driving device 1 is a D. C.motor or an A. C. motor on which there is a fixed plate 3 with an axle 31 at one side thereof. The motor 1 has a spindle extending through the fixed plate 3 so as to engage with the pinion 2. The gear 4 is put over the axle 31 and meshed with pinion 2. On the gear 4 is mounted an eccentric rod 5 which will rotate therewith. Hence, when the motor 1 is turned on, the spindle thereof will drive the pinion 2 which in turn will drive the gear 4 thereby causing the eccentric rod 5 to rotate about the axle of the gear 4.

The yoke 6 is an elongated member with a slot 61 receiving the eccentric rod 5 of the gear 4 so that when the eccentric rod 5 rotates about the axle of the gear 4, the yoke 6 will move backwards and forwards. The yoke 6 is further formed at two ends with two guide slots 62 and 63 for receiving two pins 8 and 9 respectively. The pins 8 and 9 are rigidly fixed in the housing of the portable power saw for guiding the reciprocating direction of the yoke 6. The right end (with respect to FIGS. 1 and 2) of the of the yoke 6 bears against a first end of the air chamber 7. As the yoke 6 moves backwards and forwards, the air chamber 7 will be intermittently compressed thereby exhausting air to remove the saw dust accumulated in front of a saw blade 120. One end of the plastic pipe 110 is connected to an outlet 72 (not shown) of the air chamber 7 while the other end thereof is disposed behind the saw blade 120 for blowing away the saw dust accumulated in front of the saw blade 120. The saw blade 120 is tightly clamped in position on the other end of the yoke 6 by fixing block 10 and so it can reciprocate with the yoke 6 for severing.

Further, the maxium stroke of the yoke 6 is just equal to the maxium compression of the air chamber 7, i.e., the air chamber 7 will not be compressed when the yoke 6 is at its lower dead point but will be at maxium compression when the yoke 6 it at its upper dead point.

In consequence, when the motor 1 is actuated, the spindle thereof will drive the pinion 2 which in turn will drive the gear 4 thereby causing the eccentric rod 5 to rotate about the axle of the gear 4. Therefore, the yoke is pulled to moved backwards and forwards so as to compress the air chamber 7 intermittently which will then exhaust air via the plastic pipe 110 to remove the saw dust accumulated in front of the saw blade 12.

Although the present invention has been described with a certain degree of particularity, it is understood the present disclosure is made by way of example only and that numerous changes in the detailed construction and the combination and arrangement of parts may be resorted to without departing from the spirit and scope of the invention as hereinafter claimed.

I claim:

1. A dust removing device for a power saw comprising:

a motor having a spindle;

a pinion mounted on said spindle of said motor;

a gear meshed with said pinion and provided with an eccentric rod thereon;

a yoke connected with said eccentric rod of said gear so that said yoke will reciprocate backwards and forwards when said gear rotates, said yoke having a lower end connected with a saw blade;

said yoke being an elongated member with a slot for receiving said eccentric rod of said gear so that when said eccentric rod rotates about said axle of said gear, said yoke will reciprocate backwards and forwards, said elongated member having a lower end and an upper end, each said end of said elongated member having a guide slot for receiving respective pins rigidly fixed in a housing of said power saw for guiding the reciprocating direction of said yoke, said upper end of said elongated member bearing against a first end of said air chamber;

a compressible air chamber connected at one end with an upper end of said yoke;

a pipe having a first end connected with an outlet of said air chamber and a second end disposed behind said saw blade;

whereby when said motor is turned on, said spindle will drive said pinion which in turn will drive said gear thereby causing said eccentric rod to rotate about an axle of said gear and therefore, pulling said yoke to move backwards and forwards to compress said air chamber to exhaust air to remove saw dust accumulated in front of said saw blade.

2. A dust removing device for a power saw comprising:

a motor having a spindle;

a pinion mounted on said spindle of said motor;

a gear meshed with said pinion and provided with an eccentric rod thereon;

a yoke including an elongated member with a slot for receiving said eccentric rod of said gear so that said gear will reciprocate backwards and forwards when said gear rotates, said elongated member having a lower end and an upper end, each said end of said elongated member having a guide slot for receiving respective pins rigidly fixed in a housing of said power saw for guiding the reciprocating direction of said yoke, said upper end of said elongated member bearing against a first end of a compressible air chamber;

a pipe having an end connected with an outlet of said air chamber and having a pipe having a first end connected with an outlet of said air chamber and a second end disposed behind a saw blade;

whereby when said motor is turned on, said spindle thereof will drive said pinion which in turn will drive said gear thereby causing said eccentric rod to rotate about an axle of said gear and therefore pulling said yoke to reciprocate backwards and forwards to compress said air chamber to exhaust air to remove sawdust accumulated in front of said saw blade.

\* \* \* \* \*